US009967216B2

(12) United States Patent
Damis et al.

(10) Patent No.: US 9,967,216 B2
(45) Date of Patent: May 8, 2018

(54) SYSTEM AND METHOD FOR AIR TRAFFIC MANAGEMENT COORDINATION PORTAL

(71) Applicant: PASSUR Aerospace, Inc., Stamford, CT (US)

(72) Inventors: Robert Damis, Patchogue, NY (US); William Leber, New Richmond, WI (US); Ron Dunsky, Brooklyn, NY (US)

(73) Assignee: PASSUR AEROSPACE INC., Stamford, CT (US)

( * ) Notice: Subject to any disclaimer, the term of this patent is extended or adjusted under 35 U.S.C. 154(b) by 908 days.

(21) Appl. No.: 13/927,825

(22) Filed: Jun. 26, 2013

(65) Prior Publication Data
US 2013/0346887 A1    Dec. 26, 2013

Related U.S. Application Data

(60) Provisional application No. 61/664,550, filed on Jun. 26, 2012.

(51) Int. Cl.
*H04L 12/58*    (2006.01)
(52) U.S. Cl.
CPC .................................. *H04L 51/046* (2013.01)
(58) Field of Classification Search
CPC ....................................................... H04L 12/58
See application file for complete search history.

(56) References Cited

U.S. PATENT DOCUMENTS

| 7,081,834 | B2 * | 7/2006 | Ruokangas | G01W 1/02 340/601 |
|---|---|---|---|---|
| 8,271,509 | B2 * | 9/2012 | Dauginas | G06Q 30/02 705/304 |
| 9,015,245 | B1 * | 4/2015 | Lee | H04L 29/06476 709/203 |
| 2005/0216139 | A1 * | 9/2005 | Laughlin | G08G 5/0013 701/3 |
| 2006/0147882 | A1 * | 7/2006 | Sambucetti | G09B 19/00 434/219 |
| 2007/0288560 | A1 * | 12/2007 | Bou-Ghannam | G06Q 10/107 709/204 |
| 2008/0282338 | A1 * | 11/2008 | Beer | G06F 21/566 726/12 |
| 2012/0177198 | A1 * | 7/2012 | Cabos | H04L 9/0825 380/270 |

(Continued)

*Primary Examiner* — David Choi
(74) *Attorney, Agent, or Firm* — Fay Kaplun & Marcin, LLP (57) ABSTRACT

A server, a device, and a system includes functionalities for an air traffic management coordination portal. The server includes a processor executing a chat application. The processor receives a request from a first electronic device of a first user to perform a first chat session utilizing the chat application with a first representative utilizing a second electronic device. The first user is an aviation industry professional and the first representative having access to field condition report data related to an aviation industry. The first chat session is viewable by the first user and a second user such that the first and second users receive the field condition report data concurrently. The server includes a transceiver receiving first input data from the first user and second input data from the first representative. The first and second input data are first text to be shown in the first chat session.

19 Claims, 9 Drawing Sheets

(56) References Cited

U.S. PATENT DOCUMENTS

| | | | |
|---|---|---|---|
| 2012/0214564 A1* | 8/2012 | Barclay | G07F 17/3227 463/11 |
| 2013/0075532 A1* | 3/2013 | Fuscone | B64D 37/00 244/135 A |
| 2013/0307997 A1* | 11/2013 | O'Keefe | H04L 51/10 348/207.1 |
| 2013/0346887 A1* | 12/2013 | Damis | H04L 51/046 715/758 |

\* cited by examiner

SYSTEM AND METHOD FOR AIR TRAFFIC MANAGEMENT COORDINATION PORTAL

PRIORITY CLAIM/INCORPORATION BY REFERENCE

The present application claims priority to U.S. Provisional Patent Application 61/664,550 filed on Jun. 26, 2012 entitled "Air Traffic Management Coordination Portal" naming Robert Damis, William Leber, and Ron Dunsky as inventors, and hereby incorporates, by reference, the entire subject matter of this Provisional Application.

BACKGROUND INFORMATION

An airport may experience various events that cause delays or other issues, thereby affecting scheduled operations. Accordingly, it is important for an airline to receive current field condition report information such as NOTAM (Notice to Airmen) and non-NOTAM. NOTAM information may provide airlines and pilots with data relating to hazardous conditions en route of a flight or at a specific location. Non-NOTAM information may provide airlines and pilots with other data relating to non-hazardous conditions. By receiving this type of information (particularly in real time) from airports, airlines are able to address diversion management or other irregular operations such as extended tarmac delays and snow events. Airports and airlines may also request information about conditions in nearby airports (particularly airports that are part of a larger "metroplex" operation) to aid in addressing diversion management and the irregular operations.

A conventional manner of proving current field condition report information entails forming a document and electronically sending the document to a user. For example, an alert for a condition at a particular airport of interest may have been sent by email. However, this email was required to be sent to all users in which the airport is of interest. This results in unnecessary communications traffic and redundancy in providing the same pertinent information to each user. This may also multiple the unnecessary communications and redundancy when a subsequent follow-up is to be provided as an email must be sent to each user for the follow-up field condition report.

Thus, there is a need for an efficient manner of providing field condition report information such that unnecessary communications and redundancy is minimized or eliminated.

SUMMARY OF THE INVENTION

A server comprises a processor configured to execute a chat application, the processor receiving a request from a first electronic device of a first user to perform a first chat session utilizing the chat application with a first representative utilizing a second electronic device, the first user being an aviation industry professional and the first representative having access to field condition report data related to an aviation industry, the first chat session being viewable by the first user and a second user such that the first and second users receive the field condition report data concurrently and a transceiver configured to receive first input data from the first user and second input data from the first representative, the first and second input data being first text to be shown in the first chat session.

A device comprises a processor configured to execute a chat application, the processor generating a request for a server providing the chat application to perform a first chat session between a first user of the device and a first representative utilizing a further device, the first user being an aviation industry professional and the first representative having access to field condition report data related to an aviation industry, the first chat session being viewable by the first user and a second user such that the first and second users receive the field condition report data concurrently, a display device configured to show the first chat session, and a transceiver configured to transmit the request and transmit first input data, the first input data being first text to be shown in the first chat session.

A system comprises a server configured to execute a chat application, a first device configured to execute the chat application provided by the server, the first device being utilized by a user, the user being an aviation industry professional, a second device configured to execute the chat application provided by the server, the second device being utilized by a representative, the representative having access to field condition report data related to an aviation industry, wherein a chat session is performed between the first and second devices, the chat session being viewable by the first user, the representative, and a further user such that the first and second users receive the field condition report data concurrently.

DETAILED DESCRIPTION

The exemplary embodiments may be further understood with reference to the following description of the exemplary embodiments and the related appended drawings, wherein like elements are provided with the same reference numerals. The exemplary embodiments are related to a system and method of a service for providing current field condition report information to users. Specifically, the service provides a chat platform in which users may participate in a public chat platform or in a private chat platform such that the current field condition report information is relayed. Furthermore, the users of the service must be verified aviation industry professionals or authorized users related to the aviation industry.

A flight may experience various events such as delays. The airline may attempt to compensate for these delays to return to the scheduled flight plan. In order to return to the scheduled flight plan, the airline requires information from airports regarding conditions or other relevant data that may affect the schedule for the airline. The airline may also require information regarding hazardous conditions (NOTAM information) so that the airline may provide a pilot with alterations to the scheduled flight. For example, if a destination airport has experienced a hazardous event or has hazardous landing conditions, the airplane may be directed to land at a nearby airport. The airline will therefore also require information regarding the nearby airport. In order to compensate for these various events efficiently, the airline must receive this information in a timely manner. A service that provides this information must therefore be capable of transmitting this information in an efficient manner as well. For example, removing a need to transmit redundant data to multiple recipients ultimately decreases an overall time necessary to provide the information.

Figure 1:
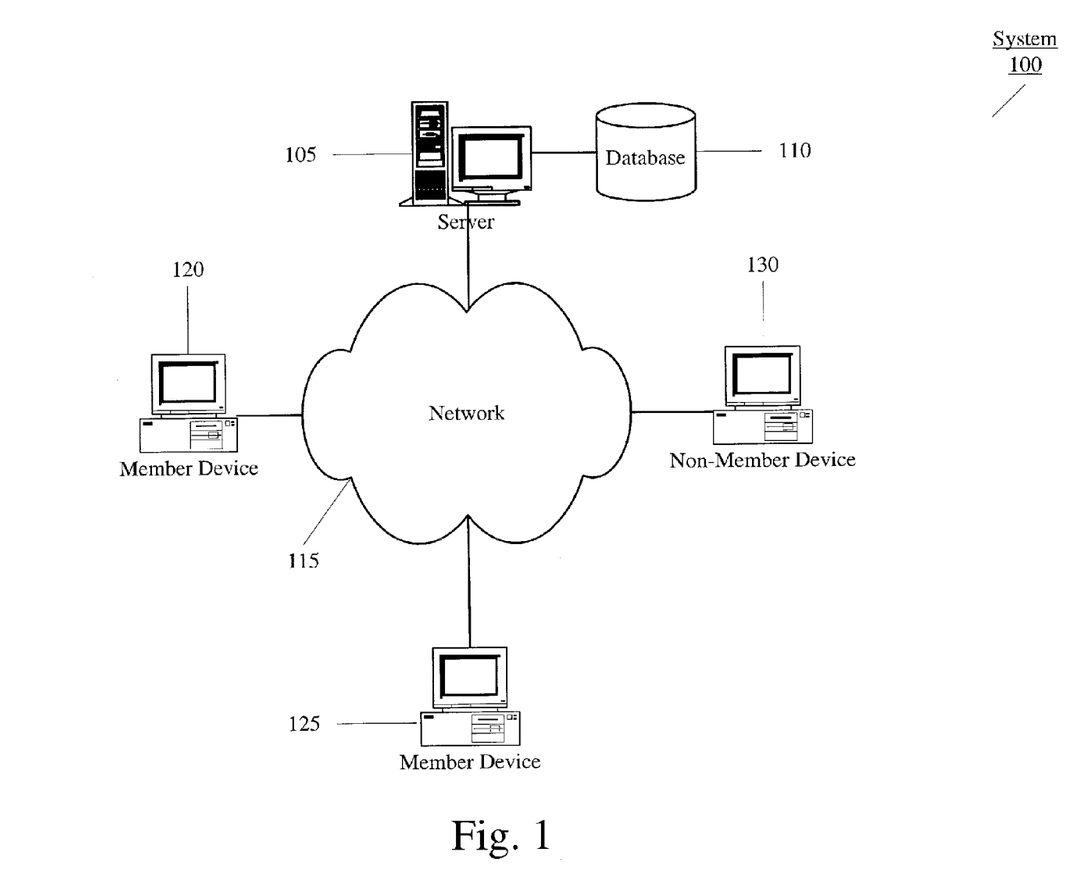
FIG. 1 shows a system for a service providing field condition report information according to the exemplary embodiments.

FIG. 1 shows a system 100 for a service providing field condition report information according to the exemplary embodiments. The exemplary embodiments relate to the service being provided on a website in which various functionalities may be provided. The website may utilize a portal in which users may access the data associated with the website. However, it should be noted that the use of a website is only exemplary. For example, the service may also be provided in various other formats, platforms, etc. such as an application for a mobile unit, an executable program on an electronic device, etc. Therefore, the website used herein represents any format in which the service may be provided. The system 100 may include a server 105, a database 110, and a plurality of electronic devices 120-130 communicatively coupled to the server 105 via a network 115.

The server 105 may provide the service to the users. As used herein, the server 105 may provide a website accessible to the users such that field condition report information is displayed. Accordingly, each user may utilize an electronic device that executes a browser application to access the website. The server 105 may provide the website using any known manner, using any known programming language, using any known script, etc. As will be described in further detail below, the website may provide various functionalities, in particular a chat application in which the field condition report information is shown. The server 105 may retrieve the field condition report information which is stored in the database 110. Furthermore, the server 105 may retrieve user settings from the database 110 that indicates the respective field condition report information to be shown. In addition, the server 105 may receive inputs from the user that may also indicate the respective field condition report information to be shown.

It should be noted that the use of the server 105 is only exemplary to provide the service. The system 100 may include further servers or network components that are also configured to provide the service or aid in providing the service. For example, the server 105 may provide the field condition report information but further servers may be configured to compile the various different types of field condition report information. Thus, a first further server may be a server for hazardous conditions related to airports to generate NOTAM information related to airports that is provided to the server 105. A second further server may be servers for individual airports to generate non-NOTAM information related to the respective airport that is provided to the server 105.

The network 115 may be any network that allows data to be transmitted therethrough from a first end point to a second end point. Specifically, according to the exemplary embodiments, the network 115 may allow data from the server 105 to be transmitted therethrough to the electronic devices 120-130. The network 115 may also allow data from the electronic device 120-130 to be transmitted therethrough to the server 105. Furthermore, if the above described further servers are remote to the server 105, the data may be transmitted through the network 115. The network 115 may be any configuration. For example, the network 115 may be the Internet. In another example, the network 115 may be a proprietary or private network in which authorized servers are only allowed to transmit data therethrough.

The electronic device 120-130 may be any device used by an aviation industry professional or authorized aviation industry user. For example, the electronic device 120-130 may be a stationary computer (e.g., a desktop terminal) or a handheld mobile device (e.g., a laptop, a personal digital assistant, a tablet, a cellular phone, etc.). The electronic device 120-130 may include a plurality of components, select ones (e.g., processor, memory arrangement, transceiver, etc.) of which are used to execute a browser application such that the website provided by the server 105 may be accessed.

As will be described in further detail below, the electronic devices 120, 125 may relate to devices used by aviation industry professionals or authorized aviation industry users who are registered with the service provided by the server 105. Specifically, the service may be provided by the International Air Transportation Association (IATA) and PASSUR Aerospace Inc. such that an IATA tactical operations portal (ITOP) is provided to IATA members. With regard to North America, the field condition report information related to the service may be for the 105 North American airports within the airline information network of the IATA. However, the exemplary embodiments also provide guests or unregistered users to access select portions of the service.

Figure 2:
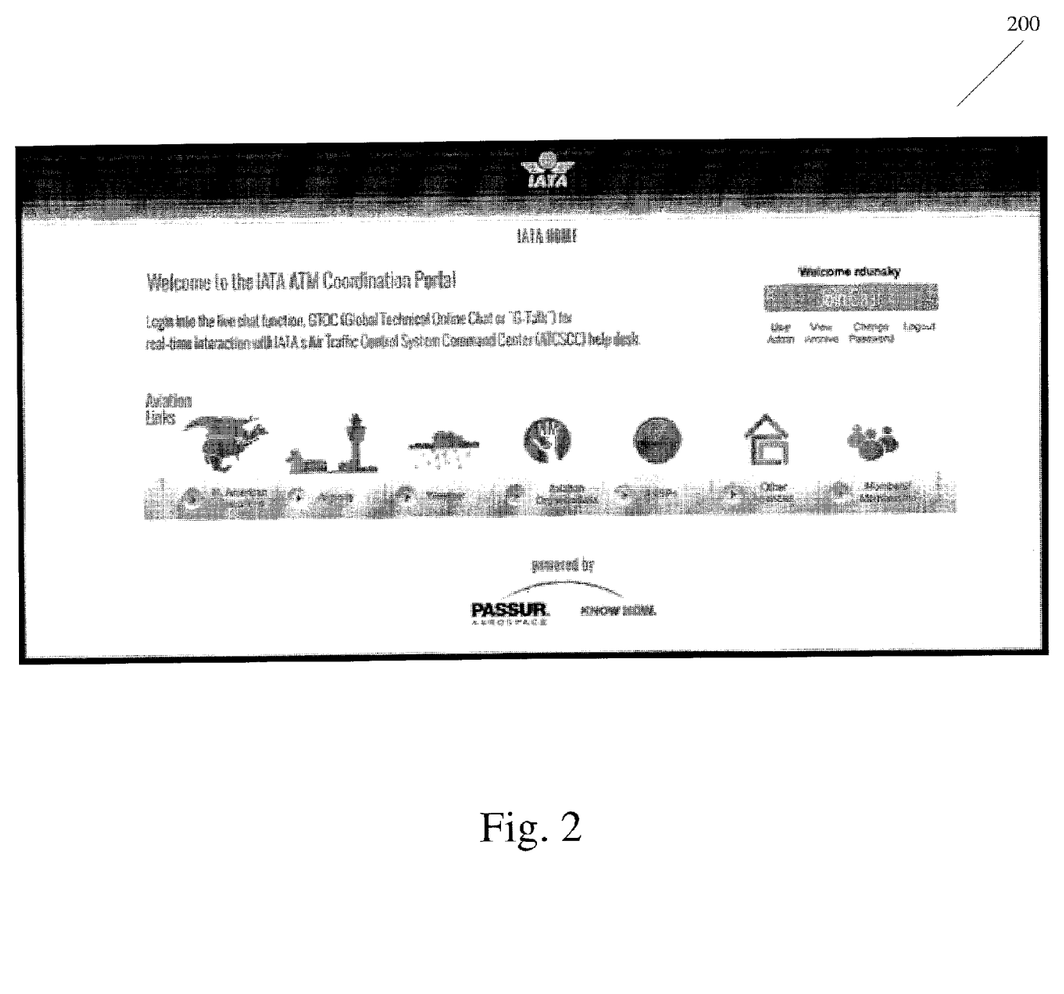
FIG. 2 shows an initial display for the service of FIG. 1 according to the exemplary embodiments.

A user may access the service provided by the server 105 by initially transmitting a request. Again, the exemplary embodiments of the service provided by the server 105 will be described with regard to a website. Thus, the devices 120-130 may transmit a request for a webpage of the website. FIG. 2 shows an initial display for the service of FIG. 1 according to the exemplary embodiments. Specifically, FIG. 2 illustrates an exemplary layout 200 for a home page of the website.

The layout 200 may include a plurality of textual and visual components. For example, the textual components may include a "Welcome" message and a brief description of the purpose of the service. Links may also be provided using textual components, visual components, or a combination thereof such that various functionalities may be accessed or various data may be shown. The layout 200 also provides select data to be shown publicly to non-member devices such as device 130 or member devices such as devices 120, 125 who have selected to not log into the service. The publicly available data may be restricted such that the data does not relate to information to be provided to aviation related users only. The layout 200 provides a plurality of aviation links to access factual data or non-real time data. For example, the aviation links may include a North American Operations link providing basic data related to aviation operations in North America, an airports link providing basic data related airports in North America, a weather link providing weather data at airports in North America, an aviation organizations link providing data of the various organizations involved with aviation in North America, etc. The publicly available aviation links on the layout 200 may forward the user to a further website provided by the server 105 or to a website not provided by the server 105. As any web-based programming language may be used (e.g., JAVA), the layout 200 may include mouse-over options such that a menu or a floating window may be shown.

It should be noted that since the layout 200 may be accessed by any user, the layout 200 may include advertisement related links as well. For example, an aviation careers link may be provided such that users are forwarded to a website of an institution that provides education in the aviation industry. The organization providing the service on the server 105 and the institution may have an agreement in which the aviation careers link may provide the specific institution.

It should also be noted that the layout 200 including information for all users accessing the website is only exemplary. For example, the layout 200 may not include any available links for the users except for an option to log into the service.

Figure 3A:
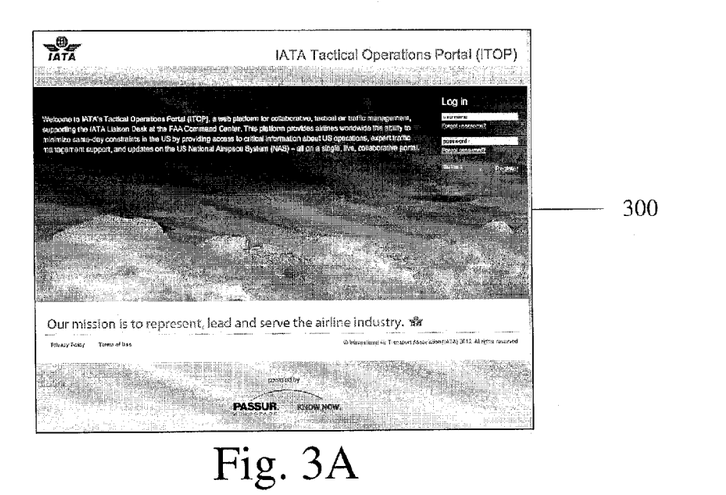
FIGS. 3A-C show member related displays for the service of FIG. 1 according to the exemplary embodiments.
Figure 3B:
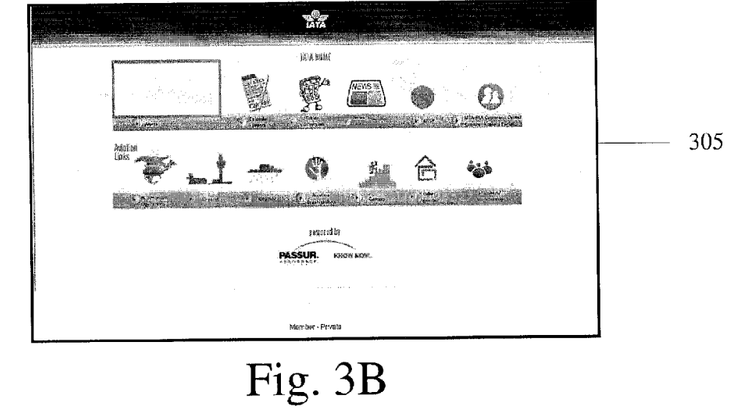
Figure 3C:
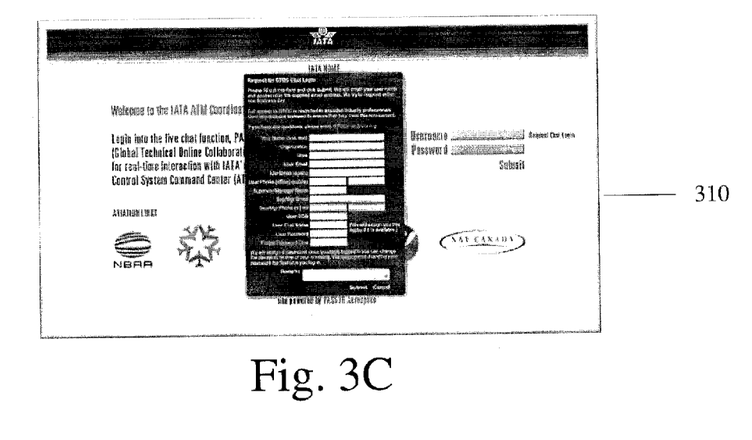

The layout 200 may include member related links as well. For example, a "log in" link may be available for members who select to log into the service. FIGS. 3A-C show member related displays for the service of FIG. 1 according to the exemplary embodiments. FIG. 3A shows an initial member website in which member identification (e.g., user ID) and authentication data (e.g., password) may be provided to authorize access to the member related functionalities of the service. Specifically, FIG. 3A shows a layout 300 which may be provided publicly (e.g., to non-members as well). The device 120, 125 which is being utilized by an aviation industry professional or authorized aviation industry user may receive the member identification input and the authentication data input which is transmitted to the server 105. The server 105 may access the database 110 which stores the member data (as will be described in further detail below) to determine whether the provided data corresponds to a verified authorized user. Once verified, the server 105 may allow the device 120, 125 to access the member related functionalities by providing a further website.

FIG. 3B shows a subsequent member website in which a plurality of member only functionalities may be accessed. FIG. 3B illustrates a layout 305 which is an initial website once a member has logged into the service. The layout 305 may include a plurality of links for the various functionalities provided through the service. In a specific example, the links on the layout 305 may be for field condition report information or other real-time data that may be relevant for an aviation industry user. For example, the real-time data may be an "alerts box" that displays information alerts generated by IATA authorized administrators. The exemplary embodiments further relate to a member only functionality in which a chat application is provided. The chat application will be described in further detail below.

As discussed above, the member may be an authorized aviation industry professional or authorized aviation industry user. To verify that the member is indeed authorized, the member may be required to provide pertinent inputs to authenticate whether the functionalities of the service may be provided to the user. FIG. 3C shows a layout 310 in which a user may register with the service to become a member. The layout 310 includes a plurality of fields that the server 105 receives to verify the authorization of the user. The server 105 may access data in the database 110, other authorization service, or authority that indicates whether the user is authorized based upon the inputs provided in the fields. For example, the plurality of fields may require the user to provide a first and last name, an organization, a role at the organization, contact information, etc. Upon authorizing the user as a member, the server 105 may transmit a secure message or email to provide a user identification and associated password in order to access the member functionalities or may simply verify that the user has been verified and a member account has been created based upon a provided user identification and associated password. The layout 310 may also include information or links to the information relating to benefits of membership to the service as well as contract terms of membership (e.g., end user licensing agreement, terms and conditions, etc.).

It should be noted that the service may provide a user with an option for the server 105 to provide the user identification or associated password in case the user has forgotten or lost this information. The fields in the layout 310 may include a security question with a security answer that verifies that the user is the member who has forgotten the log in data. Subsequently, if the security question is properly answered, the server 105 may provide the user identification or enable the user to provide a new password to be associated with the user identification.

As discussed above, a member only functionality provided by the service is a chat application. The chat application enables members to chat with an IATA representative who has access to current field condition report information. Accordingly, the IATA representative may provide responses to any inquiries related to field condition reports. The exemplary embodiments provide two different manners in which the chat application may be utilized. In a first manner, a public chat application may be executed by the service such that all chats involved in the public chat application may be viewable by the members. In a second manner, a private chat application may be executed by the service such that only the participants thereof are allowed to view the exchange.

FIGS. 4A-D show public chat related displays for the service of FIG. 1 according to the exemplary embodiments. When the member has logged into the service via the layout 300, the member may utilize the chat application by utilizing the chat link provided in the layout 305. In a first example, when the user has selected to utilize the chat application, the service may be configured to always enter the public chat application. That is, all members who access the chat application are automatically entered into the public chat. Subsequently, if a member selects to enter the private chat application, a link that is provided in the public chat application may be utilized. In a second example, when the member selects to enter the chat application, a menu may be provided such that the member may choose to utilize the public chat application or the private chat application.

Figure 4A:
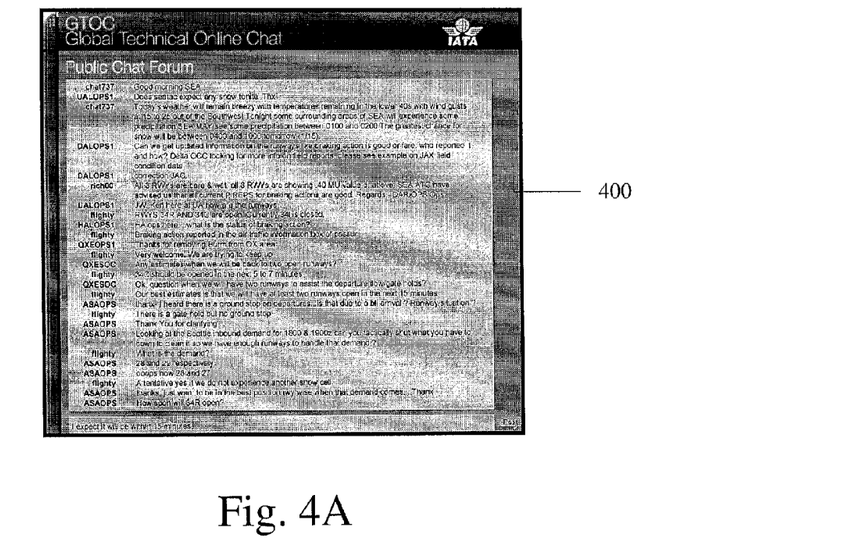
FIGS. 4A-D show public chat related displays for the service of FIG. 1 according to the exemplary embodiments.

FIG. 4A illustrates an exemplary public chat display 400 in which a plurality of different chats are concurrently being performed. That is, a first member may have a first exchange with a first representative, a second member may have a second different exchange with a second representative, etc. The text of the exchange from each of the chat sessions may be shown in the public chat display 400. The text shown in the public chat display 400 may be organized in a variety of manners. For example, the text may be shown chronologically in which a time in which text is entered dictates an order to show the text. In this manner, the text may also have an associated time stamp when the text was entered by the member which is shown such as next to the member name. These features may also relate to text entered by the IATA representative. In another example, the text may be separated by chat session such as separating the public chat display 400 into a plurality of windows for each chat session, thereby separating the text from a first chat session with the text from a second chat session. In yet another example, the text may be include the identity of the member as well as the organization in which the member is involved. This may allow a member viewing the public chat display 400 to identify whether the chat session with the member is relevant.

It should be noted that each chat session may relate to a single member but the IATA representative may be allowed to participate in more than one chat session. For example, a first member may be involved in a first chat session with a first IATA representative, a second member may be involved in a second chat session with a second IATA representative, and a third member may be involved in a third chat session with the first IATA representative.

It should also be noted that each chat session including the IATA representative is only exemplary. The public chat display 400 may be configured to show a list of currently logged in members to the service. The list may further only show currently logged in members to the chat application. A first member may select to have a chat session with a second member (i.e., a non-IATA representative). This chat session may also be shown in the public chat display 400.

Figure 4B:
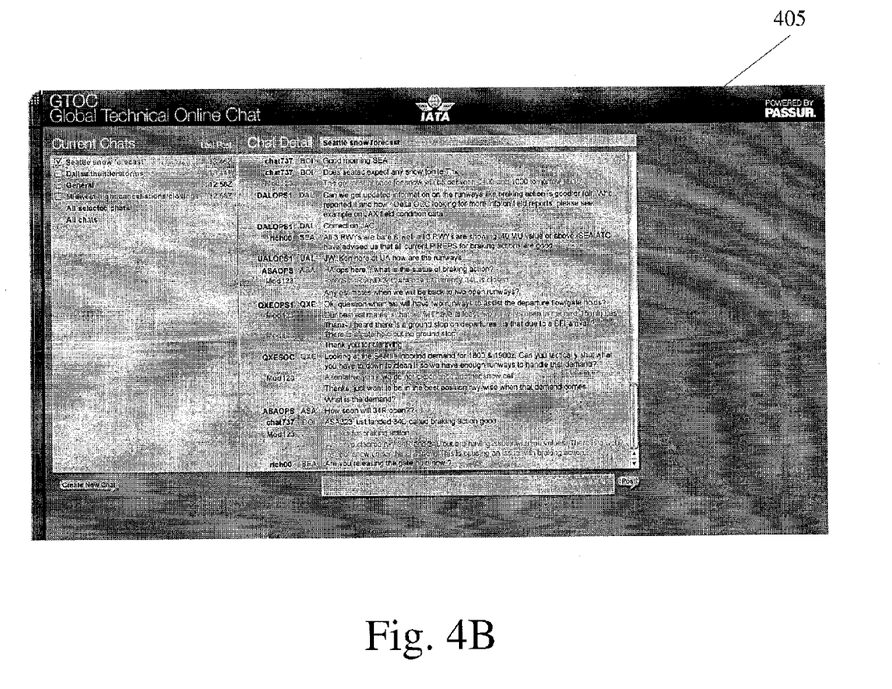

FIG. 4B illustrates an exemplary public chat display 405 in which a public chat is shown as well as an option to select chats to show within the public chat window. The option may be a menu in which the chat sessions currently being shown in the public chat window are listed. The member may select the chat sessions to be shown within the public chat window. For example, the member may select chat sessions related to a particular airport. The listed chat sessions may include identifiers or other text to indicate a general subject matter of the chat session. For example, a selected chat session shown in FIG. 4B is one regarding a snow forecast in Seattle. Other chat sessions that are currently involved in the public chat application may be for thunderstorms in Dallas, cancellations/closing in the Midwest, general chat sessions, etc. Thus, the member may select desired ones of the chat sessions to be shown in the public chat display 405.

Figure 4C:
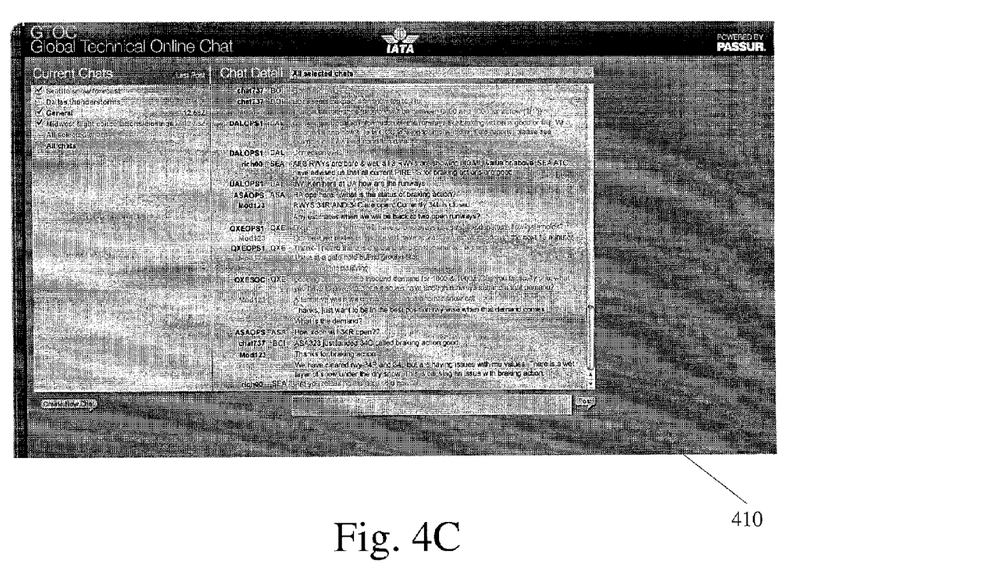

FIG. 4C illustrates an exemplary public chat display 410 in which a public chat only relates to selected ones from the list shown in the public chat display 405. As shown, the selected chats include the snow forecast in Seattle, the thunderstorms in Dallas, and the cancellations/closings in the Midwest. Accordingly, only the selected chat sessions are shown in the public chat display 410.

Figure 4D:
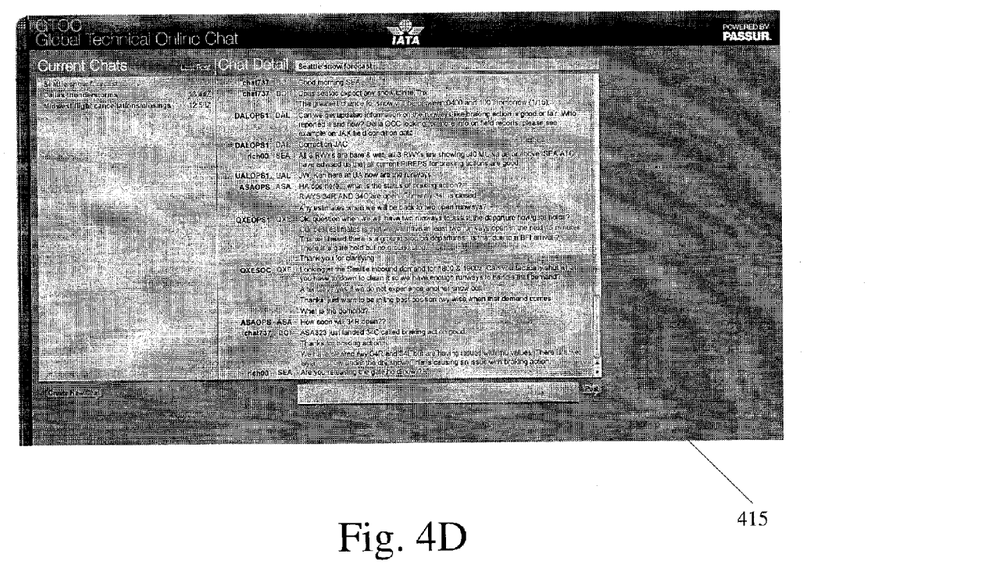

FIG. 4D illustrates an exemplary public chat display 415 in which a public chat only relates to the selected ones from the list chosen in the public chat display 410 and further shows a manner to differentiate between the selected chats. Specifically, each chat may have an associated color scheme such that a member viewing the public chat display 415 may easily distinguish one chat session from another one. The color scheme may also be shown in the text of the list of selected chat sessions such that the member may further easily identify the subject of the chat session.

It should be noted that the subject of the chat sessions in the public chat displays may be provided in a variety of manners. In a first example, the server 105 may be configured to parse the text entered by the user to automatically determine the subject matter of the ensuing chat session. In a second example, the IATA representative may name the chat session based upon the text entered by the member. In a third example, the member may name the chat session based upon a desired topic. Using any of the above examples, the list of chat sessions shown in the public chat display may have an associated topic text shown.

Figure 5:
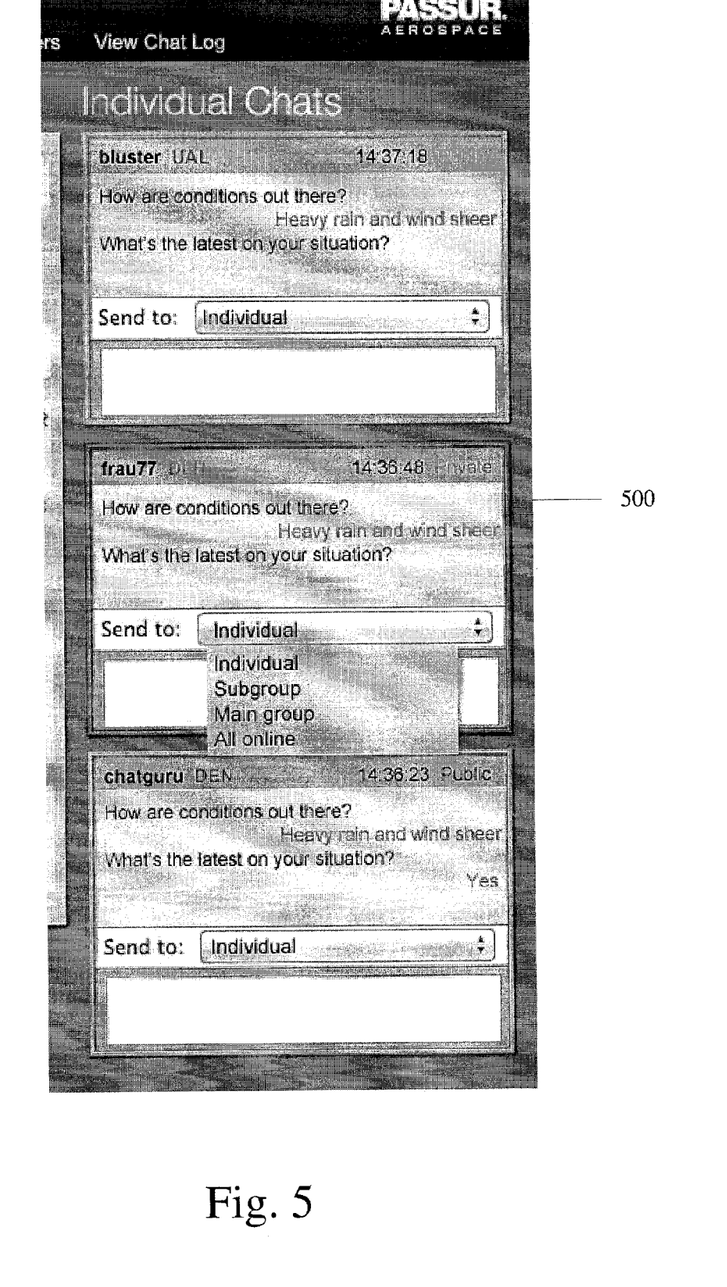
FIG. 5 shows a private chat related display according to the exemplary embodiments.

As discussed above, the chat application may also enable a user to participate in a private chat. FIG. 5 shows a private chat related display according to the exemplary embodiments. FIG. 5 illustrates a private chat display 500 in which only the member and the IATA representative are allowed to view the exchange. The first window of the private chat display 500 illustrates a chat session in the public chat window. The second window of the private chat display 500 illustrates an intended manner to send a message in which an individual is being selected. The third window of the private chat display 500 illustrates that the message is only seen/received by the intended individual. The private chat display 500 may also include a "status of session" that indicates a status of the participants. For example, when a participant is entering text, the status may show "person is typing." The status may be shown with a different font, font size, font color, etc. to indicate that the text being shown is a status. It should be noted that the status may also be used in the public chat display. However, this option may be deactivated, particularly when a relatively large number of participants are involved in which a disorganized view results.

The private chat display 500 may also relate to more than one member or more than one IATA representative. That is, the private chat display 500 may relate to any chat session in which the entirety of the public chat application population is not allowed to view the exchange. Therefore, so long as only a single member is not allowed to view the exchange, the private chat application may be utilized. In this manner, the private chat display 500 may allow the member or IATA representative to select a subgroup or other criteria to determine the participants. For example, the subgroup may be for members of airlines with a flight currently inbound to a particular airport.

Through the public chat application and the private chat application, a member is capable of receiving current field condition report information. Using the private chat application, the member is able to communicate with an IATA representative in order to directly inquire as to NOTAM and non-NOTAM data that the IATA representative has access. Using the public chat application, the member is able to view various chat exchanges, particularly when the subject of the chat session relates to a topic of concern to the member. As logged in members who are utilizing the public chat application are capable of viewing the exchange, each of the members may be provided the field condition report information for an issue of concern. In this manner, only a single transmission of data is necessary for each of the members to receive the information.

Figure 6A:
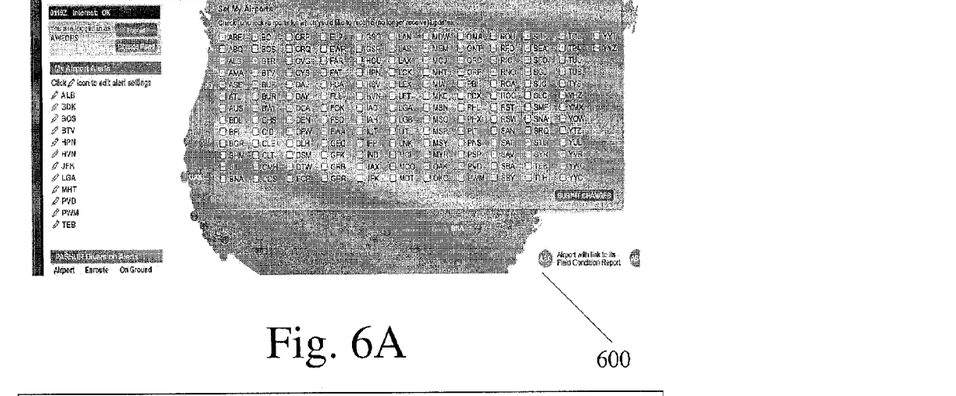
FIGS. 6A-C show member related option displays for the service of FIG. 1 according to the exemplary embodiments.
Figure 6B:
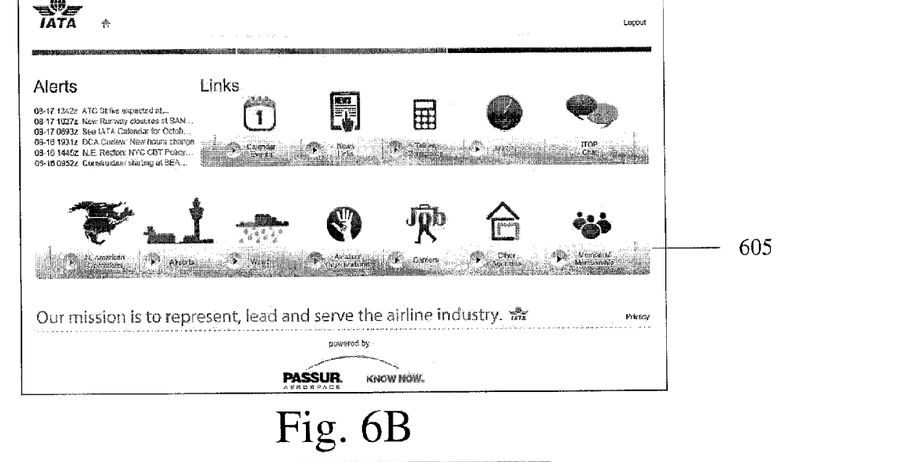
Figure 6C:
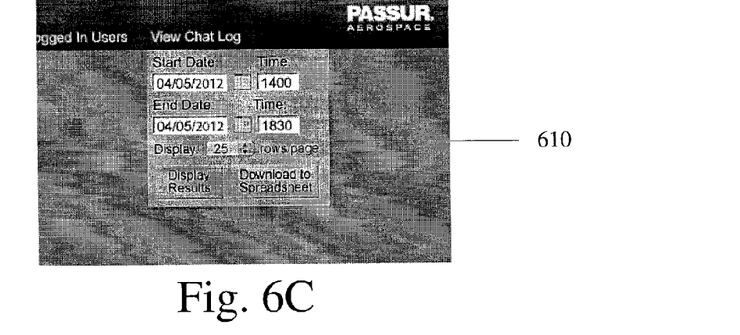

In view of the plurality of airports that may result in cluttering the chat application for a particular member, the exemplary embodiments provide a manner to streamline the relevant field condition report information that may be viewed. FIGS. 6A-C show member related option displays for the service of FIG. 1 according to the exemplary embodiments.

FIG. 6A illustrates an option for a member who has logged into the service. The option relates to indicating which airports that the member wishes to receive updates, receive alerts, view in the public chat application, etc. Upon logging into the service, the layout 305 may include a link for preferences or settings of the account of the member. The link may transmit a request to the server 105 for the settings website such that the member is allowed to select various options regarding the account. Upon setting the various options, subsequent use of various functionalities may be tailored to the settings of the member, particularly regarding the chat application. The member may be requested to provide the options in the settings upon registering with the service. The member may be permitted to return to the settings website to alter or update the selected options at any time. It should be noted that the registration process may also indicate how the settings are to be selected. For example, the identity of the member may entail various known information regarding the organization the member is involved, the position within the organization, etc. This information may be used as a first (or only) basis in which the options of the settings are selected.

FIG. 6B illustrates a functionality of the layout 305 for a member. FIG. 6B further illustrates a manner in which the selection of the airports of FIG. 6A may affect the available functionalities. Specifically, FIG. 6B shows an updated layout 605 in which an alerts box is presented. The alerts box may include a chronologically ordered list of alerts with regard to field condition report information (e.g., NOTAM and non-NOTAM). The member may simply view the alerts in the alerts box or may select an alert to receive further details regarding the alert. As discussed above, the further details may be provided in a variety of manners such as the user selecting the alert to be forwarded to another website that includes the details, the user hovering an input device over the alert such that a window is generated that include the details, etc. The alerts shown in the alerts box may be tailored for relevant alerts respective of the member based upon the selected airports. Thus, when an alert exists for a selected airport, the alerts box may include this alert within the list. However, when an alert exists for an unselected airport, the alerts box may omit this alert from the list.

FIG. 6C illustrates another functionality available for members. Specifically, FIG. 6C shows a manner of accessing a chat session that has been logged and stored (e.g., in the database 110). As will be described in further detail below, every chat session may be recorded and logged (i.e., stored) such that a member, an IATA representative, an administrator, etc. may access the chat session at a later time, particularly after the chat session has concluded or is no longer viewable in the public chat application. For example, the public chat application may be configured such that only a predetermined number of exchanges may be shown at a given time. Thus, once the predetermined number of exchanges is reached, a latest exchange may remove an earliest exchange (e.g., when the chat application orders the exchanges chronologically). The member may select a link in the layout 305 or within the displays of the chat application that provides the layout 610. The layout 610 includes an option for a chat log that has been stored to be retrieved for viewing. Thus, as the chat sessions are performed and stored in a temporal manner, a beginning time and an end time (as well as an amount per page) may be entered and transmitted from the member device to the server 105. The server 105 may retrieve the requested chat log from the database 110 and forwarded accordingly. The member device may receive the requested chat log and shown in a subsequent website or window.

It should be noted that the chat logs may be stored in a variety of manners. In a first example, the chat logs may be stored in perpetuity in the database 110 or other storage arrangement. In a second example, the chat logs may be stored for a predetermined temporal amount. For example, the chat logs may be stored for forty-five (45) days. In a third example, the chat logs may store all relevant information such as the topic of the chat session, the involved parties of the chat session, the time stamp for each exchange, etc. Other information that may be stored for the chat session may also include currently logged in members during the time of the stored chat log.

The above description relates to the user-side features. That is, the displays of the various functionalities are with regard to how a user who visits the website may utilize the service as well as how a member who logs into the website may utilize the available member functionalities of the service. In order to provide the functionalities of the service, an administrator of the service may perform various operations once the service has been set. The administrator may receive various inputs such as member registration data such that the provider-side of the functionalities are performed. The IATA representative may also have access to the provider-side of the functionalities such that the service may be maintained, updated, etc.

Figure 7A:
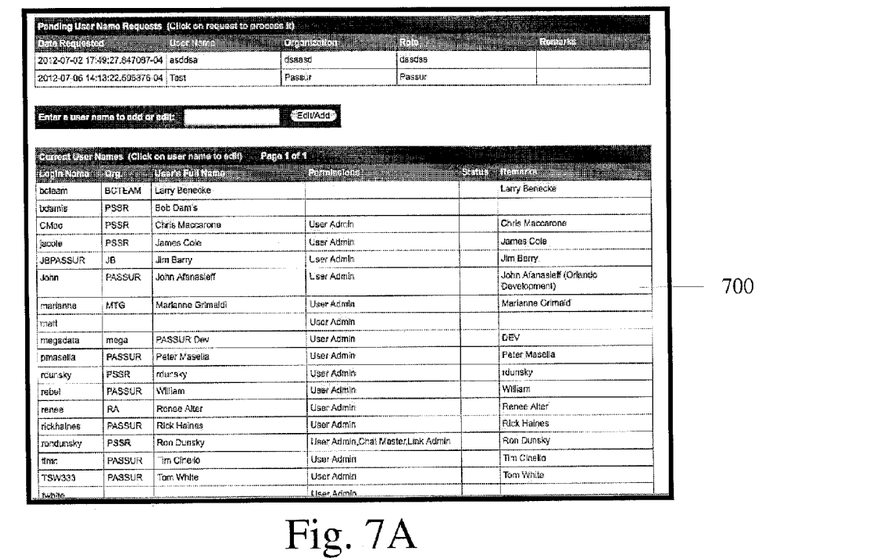
FIGS. 7A-C show administrator related displays for the service of FIG. 1 according to the exemplary embodiments.
Figure 7B:
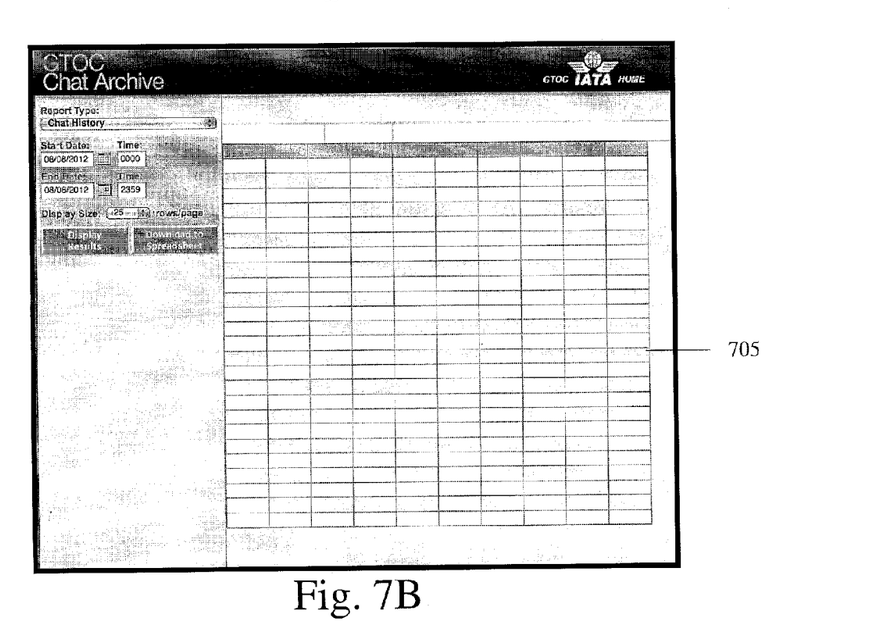
Figure 7C:
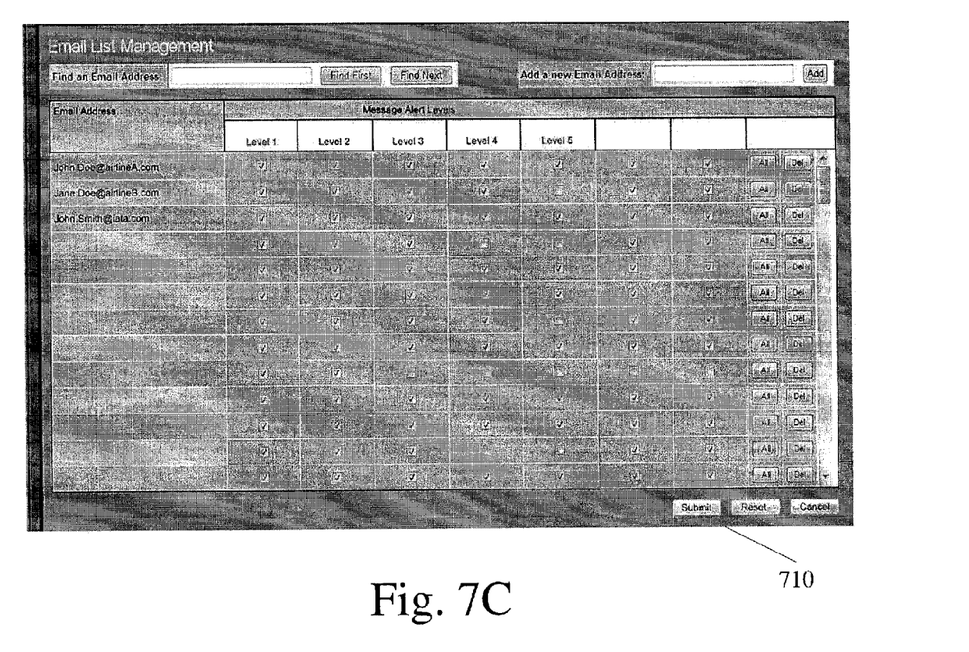

The administrator or other authorized user allowed to manage the service may access the service through the network 115. That is, the administrator may utilize an electronic device similar to the devices 120-130 to access the service. The administrator may also log into the service in a substantially similar manner as members. However, the user identification may indicate that the user is an administrator and not a member such that administrator functionalities may be accessed. FIGS. 7A-C show administrator related displays for the service of FIG. 1 according to the exemplary embodiments.

A first functionality of the administrator is the ability to create user profiles for members. FIG. 7A shows a spreadsheet 700 including a plurality of user profiles for a respective administrator or member. The spreadsheet 700 may be stored in the database 110 such that the administrator may manage the various user profiles for the other administrators/members. The spreadsheet 700 includes current users and pending users. With regard to the current users, the administrator may manage the various user profiles via the spreadsheet 700. For example, if a member has changed organizations, changed positions within an organization, changed user identification, etc., the administrator may update the spreadsheet 700 to reflect this change.

When a user enters inputs in the layout 310 in order to register with the service and create a user profile, the server 105 may be configured to automatically enter the inputs into the respective fields of the spreadsheet 700. Specifically, when a pending user account is created, the inputs may be entered accordingly. The server 105 may also automatically forward the inputs to an authority that determines whether the user is authorized (e.g., aviation industry professional, authorized user related to the aviation industry, etc.). The authority may transmit an indication that the user is authorized or not to the administrator. Subsequently, the administrator may update the spreadsheet 700 such that the user profile is moved from the pending list to the current list if authorized. If unauthorized, the administrator may remove the user profile from the pending list and may also optionally transmit a message to the requesting user that authorization was denied.

The spreadsheet 700 may also include a field that indicates a degree of permission/access to the various functionalities or the data that may be shown to each member. That is, the member identity may indicate that all data/functionalities are available, select data/functionalities are available, etc. The administrator may be informed of this level of access for each member and adjust the spreadsheet 700 to indicate a manner in which to manage the member when logged into the service. Therefore, the server 105 may reference the spreadsheet 700 to determine the level of access. In a substantially similar manner, the server 105 may reference the spreadsheet 700 for other determinations regarding user profiles including both administrators and members.

As discussed above, the chat sessions created through the chat application may be stored in the database 110. FIG. 7B illustrates an exemplary archive 705 in which the chat sessions are stored. The archive 705 may store the chat sessions using a variety of manners. For example, a chat session may be stored as a text document file in which the exchanges that occurred are stored as they appeared during the live chat session. In another example, a chat session may be converted into a storage file that may be re-converted back into a viewable format in which the exchanges that occurred are viewable. The archive 705 may be maintained by the administrator. Specifically, if the server 105 is configured to store all the chat sessions, the administrator may review the chat sessions and may manage the storage thereof. For example, if a chat session does not include any relevant field condition report information, the chat session may be removed. In another example, the administrator may organize the chat sessions in a predetermined manner (e.g., chronologically, by subject, etc.).

As discussed above, the members may have an alerts box in the layout 305, 605. Accordingly, when the member selects airports or levels of alerts to be received, the layout 605 may update the alerts box when a selected type of alert exists. The administrator may further control the alerts box by removing or updating alerts when the alert no longer exists or the alert has changed, respectively. The administrator may also utilize different formats such as when an alert has a severity index associated therewith. For example, a high alert (e.g., catastrophic condition exists) may be shown in the alerts box with a red color. In another example, a low alert (e.g., light rain) may be shown in the alerts box with a blue color. If the alerts box is configured to show conditions of selected airports as well, the condition may be shown with corresponding colors as well such as a green color indicating routine or normal operations.

Furthermore, the administrator may manage a further option for providing the alerts. FIG. 7C illustrates an exemplary spreadsheet 710 in which the administrator may manage the alerts that are to be generated for each member. The spreadsheet 710 may include a column in which contact information for each member is included. Each row for the contact information may include a plurality of columns in which a type of alert or selected related alert is chosen. Accordingly, when the alert exists for the selected alert, a message (e.g., email) may be generated for each member and transmitted thereto via the contact information). It should be noted that the criteria to receive the alert may be in a variety of manners. For example, the criteria may include a region of interest, an airport of interest, a level of user (e.g., access level), etc.

The administrator may access a variety of different storage devices such as the database 110 in order to retrieve any relevant data relating to the management of the service or to provide the field condition report information if acting as the IATA representative. The content provided and controlled by the service may be stored in a plurality of locations such as a website server (e.g., database 110) or in the devices of the administrator such as when data is to be uploaded. The managed content may include various types of data such as calendar related data, news related data, tables/measures related data, Air Navigation Service Provider (ANSP) related data, careers data, etc. As this content relates to the management of the service, only administrators or other authorized users may be given access thereto such as via the spreadsheet 700. The administrator may be allowed to utilize a further functionality that may be unavailable to members. Specifically, the administrator may utilize an upload tool such that data may be added, updated, removed, etc. by the administrator.

It should be noted that the above described features of the service are only exemplary. The exemplary embodiments may be further configured with a variety of other options. In a first example, the user identification may be indicative of the available functionalities to be provided. Thus, when the member logs into the service with the user identification, the server 105 may determine that the member is only allowed access to select functionalities. In a second example, the user identification may be indicative of associated related data such as select airports that the member is only interested, thereby disregarding other airports (as discussed above). The selection of airports may also control the available functionalities based upon which airports are being selected by the member. That is, the selected airports may also provide a basis in which the functionalities are chosen to be available. In a third example, the service may be configured to support multiple languages. Thus, the text that is shown in the various displays may be translated into a selected language. The text of the exchanges in the chat application may also be translated into a selected language, thereby providing a dynamic translation engine. In a fourth example, the various displays for the members may be customized. That is, the service may include a functionality that enables the member to alter the view of the displays for each of the functionalities. Accordingly, upon logging into the service, a customized view of the layout 305 and the chat application layouts 400-500 may be shown.

The exemplary embodiments provide a service for aviation industry professionals and authorized users related to the aviation industry. Specifically, the service provides current field condition report information to the users utilizing a chat application. The chat application may be utilized by members of the service upon logging in thereto. The chat application may include a plurality of different chat sessions that are occurring concurrently in which different aviation related topics are being discussed. Members may select a chat session to view within the chat application such that the field condition report information may be received.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. In a further example, the exemplary embodiments of the service may be a program containing lines of code stored on a non-transitory computer readable storage medium that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A server, comprising:
 a processor configured to execute a chat application, the processor receiving a request from a first electronic device of a first user to perform a first chat session utilizing the chat application with a first representative utilizing a second electronic device, the first user being an aviation industry professional and the first representative having access to field condition report data related to an aviation industry, the first chat session being viewable by the first user and a second user such that the first and second users receive the field condition report data concurrently, wherein the second electronic device receives input from the first representative in response to an inquiry input by the first user, wherein the inquiry and the input are parsed to automatically determine a subject of the first chat session, the subject relating at least to a flight location, wherein an additional user is selectively excluded access from the input received by the second electronic device, wherein the additional user is selectively excluded when the additional user is a member of an airline that does not have a flight associated with the subject of the first chat session; and a transceiver configured to receive first input data from the first user and second input data from the first representative, the first and second input data being first text to be shown in the first chat session.

2. The server of claim 1, further comprising:

a memory arrangement configured to store the chat application, the first chat session, and the first and second input data.

3. The server of claim 1, wherein the first input data includes an identity of the first user and the second input data includes an identity of the first representative.

4. The server of claim 1, wherein the processor is configured to receive a request from a third electronic device of a third user to perform a second chat session with a second representative utilizing a fourth electronic device, the third user being a further aviation industry professional and the second representative having access to the field condition report data and wherein the transceiver is configured to receive third input data from the second user and fourth input data from the second representative, the third and fourth input data being second text to be shown in the second chat session.

5. The server of claim 4, wherein the first and second chat sessions are shown in a common view.

6. The server of claim 5, wherein the first and second text are shown chronologically in the common view.

7. The server of claim 5, wherein the first text is shown utilizing a first color and the second text is shown utilizing a second color.

8. The server of claim 1, wherein the processor is configured to display alerts to the first user as a function of predetermined airport selections.

9. The server of claim 1, wherein the processor is configured to change a setting of the first chat session such that the second user is prevented from viewing the first text.

10. The server of claim 1, wherein the chat application is a functionality of a website.

11. A device, comprising:

a processor configured to execute a chat application, the processor generating a request for a server providing the chat application to perform a first chat session between a first user of the device and a first representative utilizing a second device, the first user being an aviation industry professional and the first representative having access to field condition report data related to an aviation industry, the first chat session being viewable by the first user and a second user such that the first and second users receive the field condition report data concurrently, wherein the second device receives input from the first representative in response to an inquiry input by the first user, wherein the inquiry and the input are parsed to automatically determine a subject of the first chat session, the subject relating at least to a flight location, wherein an additional user is selectively exclude access from the input received by the second electronic device, wherein the additional user is selectively excluded when the additional user is a member of an airline that does not have a flight associated with the subject of the first chat session;

a display device configured to show the first chat session; and a transceiver configured to transmit the request and transmit first input data, the first input data being first text to be shown in the first chat session.

12. The device of claim 11, wherein the first chat session further shows second text from second input data received from the first representative.

13. The device of claim 12, wherein the first input data includes an identity of the first user and the second input data includes an identity of the first representative.

14. The device of claim 12, wherein the first and second text are shown chronologically.

15. The device of claim 11, wherein the display device includes a common area in which the first chat session and a second chat session is shown, the second chat session being between a third user and a second representative.

16. The device of claim 15, wherein the first chat session is shown utilizing a first color and the second chat session is shown utilizing a second color.

17. The device of claim 11, wherein the transceiver is configured to transmit airport selections of the first user to the server.

18. The device of claim 17, wherein the chat application is configured to display alerts to the first user as a function of the airport selections.

19. The device of claim 11, wherein the transceiver is configured to transmit a request to change a setting of the first chat session such that the second user is prevented from viewing the first text.

* * * * *